May 19, 1953 J. MAHLER 2,639,290
REACTION PRODUCTS OF CUPRIC CHLORIDE AND
AMINO HYDROQUINONE ETHERS AND PROCESS
Filed June 30, 1950
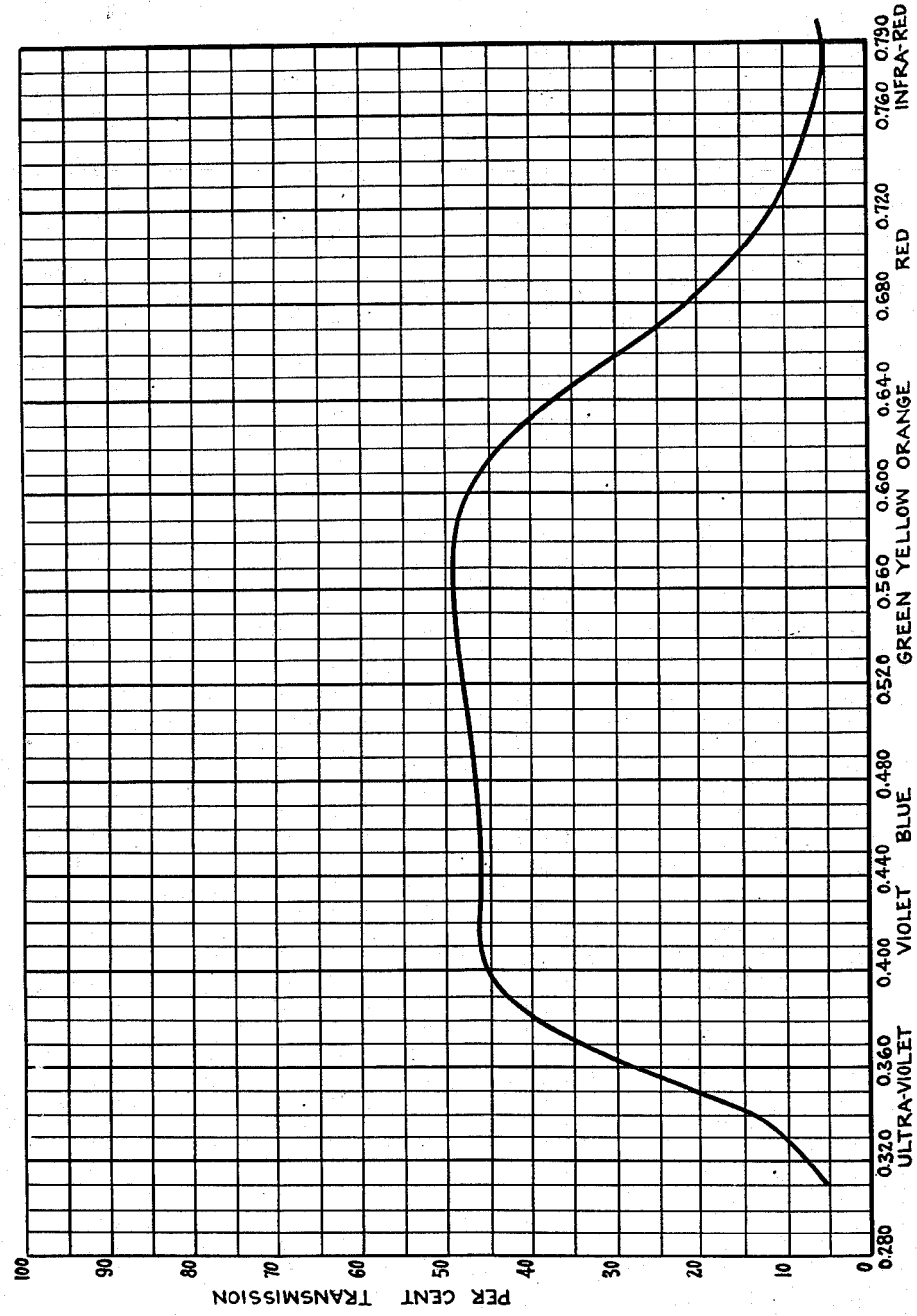
INVENTOR
JOSEPH MAHLER
BY
ATTORNEY Patented May 19, 1953

2,639,290

UNITED STATES PATENT OFFICE 2,639,290

REACTION PRODUCTS OF CUPRIC CHLORIDE AND AMINO HYDROQUINONE ETHERS AND PROCESS

Joseph Mahler, Southport, Conn., assignor to American Optical Company, Southbridge, Mass., a voluntary association of Massachusetts Application June 30, 1950, Serial No. 171,473

12 Claims. (Cl. 260—438)

This invention relates to precipitates and has particular reference to a novel precipitate of a relatively solid and dense nature, black in color, having opaque non-reflecting characteristics, capable of being rendered powdery in nature, and method of making and using the same, and articles resulting therefrom.

One of the principal objects of the invention is to provide a chemical composition and method of making the same from which a precipitation of particles of an opaque, black, non-reflective, dense nature may be obtained which may be formed into a relatively fine powdery structure whereby said particles may be dispersed throughout a transparent supporting matrix or which may be used to impregnate transparent plastic or glass materials to render them substantially neutral in color.

Another object is to provide a material of the above nature which is suitable and adaptable to many different uses including that of mixing in varied proportions, depending upon the resultant neutral shade desired, with a suitable transparent matrix in the form of a glass, plastic, or artificial resin which may thereafter be made into sheet form possessing the desired neutral color and absorption characteristics.

Another object is to provide a material of the above character which, when mixed with a transparent matrix or placed upon a suitable substratum of a transparent nature, will not only alter the visible portion of light transmitted by the resultant article but which has a substantial cutoff as to the transmission of infra-red rays, and also possesses ultra-violet absorbing characteristics.

Another object is to provide a material of the above nature which has a substantially uniform transmission throughout the violet, blue, green, yellow and orange visible portion of the spectrum and decreasing as to its transmission throughout a relatively narrow range in the red visible portion of the spectrum with a cutoff in the near infra-red region, and method of making the same whereby varying light absorptions may be obtained as desired.

Another object is to provide a material of the above character and method of making the same which is extremely resistant to heat and therefore remains quite stable as to its inherent characteristics as specified above.

Other objects and advantages of the invention will become apparent from the following description taken in connection with the accompanying drawing which illustrates the spectral transmission of a plastic film made in accordance with the present invention.

The present invention is directed to the provision of a novel precipitate and method of making the same, which precipitate is of a relatively solid and dense nature, black in color, having opaque non-reflecting characteristics, and capable of being rendered powdery in nature. The precipitate is formed by providing a novel chemical composition and allowing the composition to precipitate to form particles having the above characteristics, which particles may be dispersed throughout a transparent supporting matrix to render it substantially neutral in color and capable of absorbing controlled amounts of visible, ultra-violet and infra-red light rays.

In following the teachings of this invention, the precipitate is formed by producing a solution embodying approximately 600 cc. of denatured alcohol into which is placed approximately 7 grams of amino hydroquinone diethyl or dimethyl ether and approximately 14 grams of cupric chloride ($CuCl_2 2H_2O$). This solution is allowed to precipitate for approximately twelve hours and then the alcohol is removed preferably by filtering and the precipitate is permitted to dry to produce the solid mass which may thereafter be reduced to a powdery state if desired. This precipitate is of a dry, dense nature having an extremely black color, is opaque and non-reflective. The said material possesses the characteristics of being extremely resistant to heat and stable as to its ultimate uses.

When the precipitate is used such as by mixing it in a batch used for producing glass, or combining it with other materials to be used in fabricating transparent plastic or resinous films or the like, the resultant density of said materials may be varied by the amount of precipitate placed in the mix during the initial fabrication thereof. In each instance, the cutoff in the visible ray transmission will be substantially that set forth in the curve shown in the drawing, it being understood, of course, that the position of the curve on the chart will vary according to the overall density thereof. Such a material will absorb substantially equal amounts of light in the .400 to .600 mu regions of the visible spectrum, will absorb increasing amounts in the .600 to .790 mu regions, with not more than approximately 5% of transmission in the approximate .790 mu near infra-red region, and will absorb sharply increasing amounts in the .400 to .310 regions of the spectrum with not more than 5% transmission at approximately .310 mu in the ultra-violet region.

It is further pointed out that the drawing shows the curve of a treated sheet of cellulose acetate which is one of the plastics which may be used. Here again, a controlled amount of the precipitate would be mixed with the plastic prior to its being fabricated into sheet form.

Although specific proportions of the compositions which are embodied in the solution have been given, it is to be understood that the amino hydroquinone diethyl or dimethyl ether as well as the cupric chloride may be varied to many desired related proportions depending upon the characteristics desired of the resultant precipitate. It has been found, however, that the most desirable results have been obtained by retaining the 1 to 2 ratio (1 gram ether, 2 grams copper), for example, when 1 gram of ether is used, 2 grams of cupric chloride are used; if 2 grams of ether are used, 4 grams of cupric chloride are used; it being understood that the amount of alcohol is varied as desired.

It is to be understood that other organic solvents such as acetone may be used for dissolving the above materials and thereafter bringing about a reaction between the two which causes precipitation. It has been found that acetone may be used instead of alcohol with the exception that precipitation will not take place in the acetone but will take place as the acetone evaporates. Instead of cupric chloride, one could use ammonium and copper chloride which, however, does not dissolve as quickly as cupric chloride.

Since ether is not soluble in water, when it is desired to use water as a solvent it is preferable to first dissolve approximately 10 grams of the ether in approximately 20 cc. of sulphuric acid, which dissolves the ether readily. Then after dissolved the mixture is mixed with approximately 600 cc. of water to which is added about 20 grams of cupric chloride which will then be dissolved by the water. Then it is necessary to neutralize the sulphuric acid by adding to the solution approximately 20 grams of sodium hydroxide, which will also start precipitation to form the precipitate in the manner described.

If desired, the precipitate may be included in the batch mix when forming glass, plastic or other artificial resinous light transmitting media. When used in this way, the inherent characteristics of the precipitate will cause the blue and yellow-green light rays to be partially absorbed and therefore will improve the light transmitting media in which it is embodied by reducing glare which is sometimes attributed to light rays in these regions of the spectrum.

From the foregoing it will be seen that there has been provided a novel precipitate of a relatively solid and dense nature which is black in color and has opaque non-reflecting characteristics and which is further capable of being rendered powdery in nature, which precipitate may be dispersed throughout a transparent supporting matrix to render the resultant article substantially neutral in color and having a resultant transmission curve substantially as shown in the drawing.

It will be seen that simple and efficient means and method have been provided in accordance with the objects set forth hereinabove. While the novel features of the invention have been described and are pointed out in the annexed claims, it will be understood that various omissions, substitutions and changes in the forms and details illustrated and described may be made by those skilled in the art without departing from the spirit of the invention. I, therefore, do not wish to be limited to the exact details described as the preferred only are set forth by way of illustrations.

I claim:

1. A relatively fine, powdery, black, substantially dense, low reflective composition which is a precipitate resulting from the reaction of cupric chloride and an ingredient selected from the group consisting of amino hydroquinone diethyl ether and amino hydroquinone dimethyl ether in a solvent selected from the group consisting of water, acetone and denatured alcohol.

2. A relatively fine, powdery, black, substantially dense, low reflective composition which is a precipitate resulting from the reaction of cupric chloride and amino hydroquinone diethyl ether in a solvent selected from the group consisting of water, acetone and denatured alcohol, said composition being further characterized by its absorptive characteristics whereby when mixed with a transparent non-absorptive matrix it will permit transmission of approximately equal amounts of light in the violet through the orange portions of the visible spectrum and a lesser amount of light in the red region of the visible spectrum.

3. A relatively fine, powdery, black, substantially dense, low reflective composition which is a precipitate resulting from the reaction of cupric chloride and amino hydroquinone dimethyl ether in a solvent selected from the group consisting of water, acetone and denatured alcohol and having light absorptive characteristics indicated by a spectral transmission curve which is substantially level throughout the violet through the orange portions of the visible spectrum, decreasing in the red portion of the visible spectrum and having a decided cutoff in the ultra-violet and near infra-red regions of the spectrum.

4. The method of forming a relatively fine, powdery, black, substantially dense, low reflective composition comprising mixing an amount of cupric chloride with an amount of an ingredient selected from the group consisting of amino hydroquinone dimethyl ether and amino hydroquinone diethyl ether, with said amounts being controlled in accordance with the density desired of the resultant composition, dissolving the resultant mixture in a solvent selected from the group consisting of water, acetone and denatured alcohol, allowing the solution to precipitate, removing the solvent, and subsequently drying.

5. The method of forming a relatively fine, powdery, black, substantially dense, low reflective composition comprising mixing an amount of cupric chloride with an amount of an ingredient selected from the group consisting of amino hydroquinone dimethyl ether and amino hydroquinone diethyl ether, said cupric chloride being provided in an amount substantially twice the amount of the other selected ingredient used in accordance with the density desired of the resultant composition, dissolving the resultant mixture in a solvent selected from the group consisting of water, acetone and denatured alcohol, allowing the solution to precipitate, removing the solvent, and subsequently drying.

6. The method of forming a relatively fine, powdery, black, substantially dense, low reflective composition comprising mixing approximately 14 grams of cupric chloride with approximately 7 grams of an ingredient selected from the group consisting of amino hydroquinone dimethyl ether and amino hydroquinone diethyl ether, dissolving the resultant mixture in approximately 600 cc. of a solvent selected from the group consisting of water, acetone and denatured alcohol, allowing the solution to precipitate for approximately 12 hours, removing the solvent, and subsequently drying.

7. A relatively fine powdery, black, substantially dense, low reflective composition comprising the reaction product of cupric chloride and an ether selected from the group consisting of amino hydroquinone dimethyl ether and amino hydroquinone diethyl ether.

8. A precipitate comprising the black substantially dense, low-reflective reaction product of cupric chloride and amino hydroquinone di-alkyl ether.

9. The method of forming a low reflective composition of the character described having infra-red and ultra violet absorbing characteristics comprising mixing cupric chloride with amino hydroquinone ether and dissolving the mixture in a solvent therefor, allowing precipitation, removing the solvent and drying the precipitate remaining.

10. The method of forming a low reflective composition of the character described having infra-red and ultra violet absorbing characteristics comprising mixing cupric chloride with amino hydroquinone ether and dissolving the mixture in alcohol, allowing precipitation, removing the alcohol and drying the precipitate remaining.

11. The method of forming a low reflective composition of the character described having infra-red and ultra violet absorbing characteristics comprising mixing cupric chloride with amino hydroquinone ether and dissolving the mixture in acetone, allowing precipitation, removing the acetone and drying the precipitate remaining.

12. The method of forming a low reflective composition of the character described having infra-red and ultra-violet absorbing characteristics comprising mixing amino hydroquinone dialkyl ether with acid, dissolving the mixture in water, dissolving cupric chloride in the water mixture, neutralizing the acid with sodium hydroxide, allowing precipitation, removing the water and drying the precipitate.

JOSEPH MAHLER.

References Cited in the file of this patent

UNITED STATES PATENTS

| Number | Name | Date |
|---|---|---|
| 1,657,776 | Wolfe et al. | Jan. 31, 1928 |
| 1,666,047 | Jones at al. | Apr. 10, 1928 |
| 2,172,249 | Lowry | Sept. 5, 1939 |
| 2,193,035 | Matthews et al. | Mar. 12, 1940 |
| 2,278,965 | Peski et al. | Apr. 7, 1942 |
| 2,301,762 | Tuwiner | Nov. 10, 1942 |
| 2,310,228 | Gaspar | Feb. 9, 1943 |
| 2,490,717 | Steiger | Dec. 6, 1949 |

OTHER REFERENCES

Seka et al., Monatshefte Fur Chemie, vol. 57 (1931), pages 67–68.

Broome et al., Jour. Am. Chem. Soc., vol. 68, pages 67–69.